United States Patent [19]

Cady

[11] 3,989,119

[45] Nov. 2, 1976

[54] PUBLIC SERVICE VEHICLE

[75] Inventor: John Billington Cady, Goosnargh, England

[73] Assignee: British Leyland UK Limited, London, England

[22] Filed: Nov. 22, 1974

[21] Appl. No.: 526,212

[30] Foreign Application Priority Data

Nov. 24, 1973 United Kingdom............... 54635/73

[52] U.S. Cl. ............................ 180/89 R; 180/54 R; 296/28 A
[51] Int. Cl.² ......................................... B62D 23/00
[58] Field of Search ............. 180/89 R, 89 A, 54 R, 180/54 A, 54 F; 296/28 A, 37 R; 280/124 F

[56] References Cited

UNITED STATES PATENTS

| | | | |
|---|---|---|---|
| 1,596,212 | 8/1926 | Newell | 296/37 R X |
| 2,005,312 | 6/1935 | Church | 180/54 F |
| 2,039,215 | 4/1936 | Fageol | 296/28 A |
| 2,163,748 | 6/1939 | Dayes | 296/28 A |
| 2,344,983 | 3/1944 | Fageol | 180/54 R X |
| 2,407,007 | 9/1946 | Henrichsen | 180/89 R |
| 2,418,294 | 4/1947 | Flogaus | 180/54 A |
| 2,455,429 | 12/1948 | Lucien | 296/28 A |
| 2,532,057 | 11/1950 | Carlson | 180/89 R |
| 3,054,469 | 9/1962 | Muller | 180/54 R |
| 3,784,221 | 1/1974 | Frasier | 180/124 F |

OTHER PUBLICATIONS

"P.I.E. Designs for the Long Haul," Commercial Car Journal, May, 1956, pp. 76.

*Primary Examiner*—Kenneth H. Betts
*Assistant Examiner*—Terrance L. Siemens
*Attorney, Agent, or Firm*—Brisebois & Kruger

[57] ABSTRACT

A coach or bus of integral construction made up of a lower section, housing engine, suspension and service units and ducts, and an upper section incorporating a passenger saloon. The lower section comprises a sequence of boxes serving simultaneously as structural members and running component enclosures. The box walls are of readily replaceable flat panels. The combination of the upper and lower sections provides a much stiffer structure than heretofore found in conventional constructions.

3 Claims, 3 Drawing Figures

PUBLIC SERVICE VEHICLE

This invention relates to a passenger carrying public service vehicle and in particular is concerned with a coach or bus.

According to a first aspect of the present invention a passenger carrying public service vehicle includes front mounted steerable road wheels and rear mounted drivable road wheels and is characterised by the provision of:

i. a power pack for driving the rear wheels such power pack being mounted in an engine compartment forwardly of the rear wheels;

ii. a first load carrying compartment disposed between the power pack and the rear of the front wheels the first load carrying compartment extending over the width of the vehicle; and iii. a second load carrying compartment behind the rear wheels; the engine compartment and the first and second load carrying compartments being disposed beneath a floor of the vehicle.

According to a second aspect of the invention the engine compartment and the first and second load carrying compartments comprise a sequence of box structures closed on the underside, at least in part, by a load carrying floor, and closed on the upper side, at least in part, by a passenger compartment floor.

According to a third aspect of the invention a public service vehicle according to the second aspect is further characterised in that the sequence of box structures includes compartments for suspension elements, for fuel containers and for service ducts. According to a fourth aspect of the present invention a public service vehicle according to any preceding aspect is characterised in that the power pack comprises an internal combustion engine directly coupled to a gearbox; the engine compartment being offset from the centre line of the vehicle to provide a complementary compartment on the opposite side of the centre line for auxiliary equipment; the complementary compartment being co-extensive with the engine compartment.

According to a fifth aspect of the present invention a public service vehicle according to any previous aspect is characterised by a front suspension incorporating wishbone members for locating each road wheel.

According to a sixth aspect of the present invention a public service vehicle according to any preceding aspect incorporates a rear suspension comprising a beam axle located by trailing arms whose forward ends are pivotably secured to the vehicle structure; the trailing arms each comprising a tapered quarter-elliptic leaf spring. Preferably the rear end of each trailing arm is spaced from the vehicle body or chassis by an air rolling diaphragm spring or a gas/hydraulic strut or a coil spring.

According to a seventh aspect of the present invention a public service vehicle according to any preceding aspect incorporates a radiator for a cooling system for the power pack the radiator being mounted forwardly of front axle centre line. Preferably the radiator is adapted for cooling by a hydrostatically driven fan mounted on the radiator structure.

An embodiment of the invention will now be described with reference to the accompany drawings which are part sectioned views of a passenger coach of which:

Figure 1:
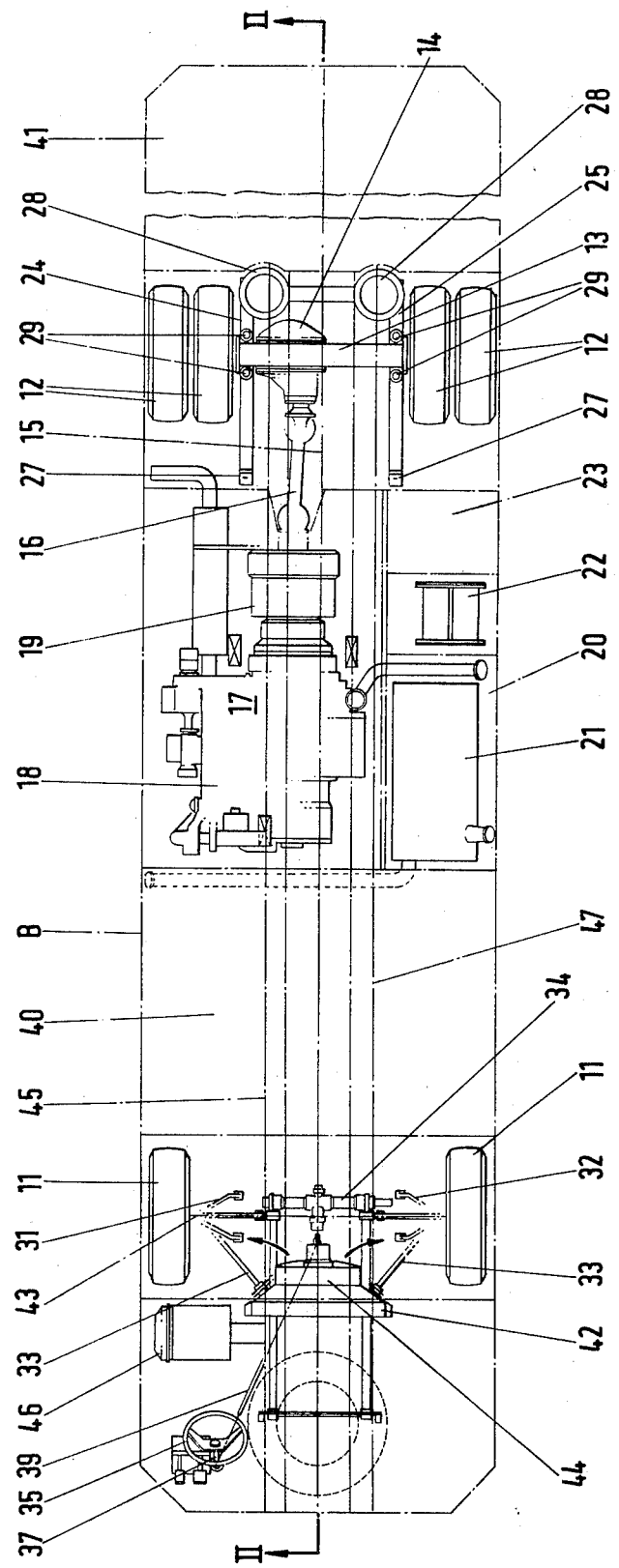
FIG. 1 is a plan view.
Figure 2:
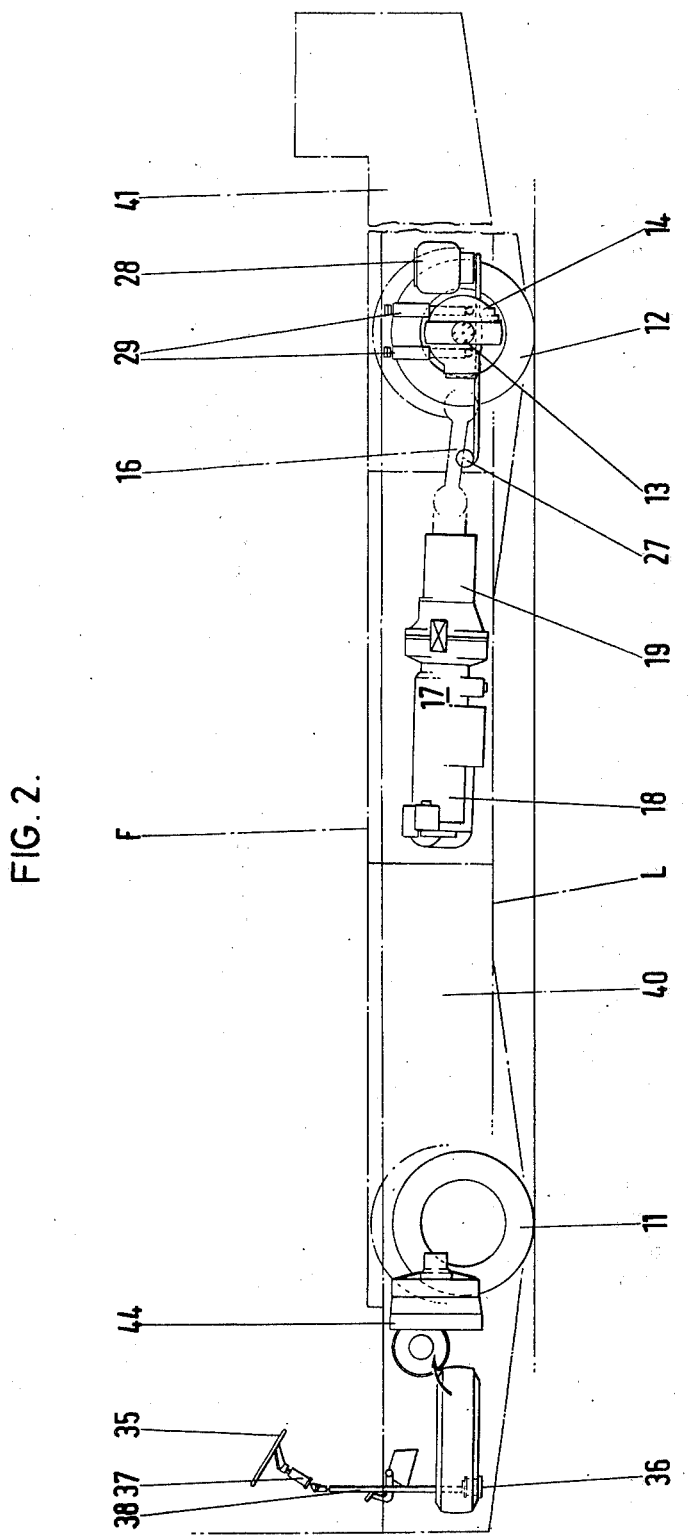
FIG. 2 is a vertical section of the centre line of FIG. 1.

FIGS. 1 and 2 show the lower part of a passenger coach having steerable front wheels 11 and drivable rear wheels 12. The rear wheels 12 are mounted on a beam axle 13 which incorporates a differential housing 14 offset from central axis 15 of the vehicle. Differential gear within housing 14 is coupled by way of a short rigid propellor shaft 16 to the outlet shaft of power pack 17 comprising a diesel engine 18 directly coupled to a five-speed gearbox 19.

Figure 3:
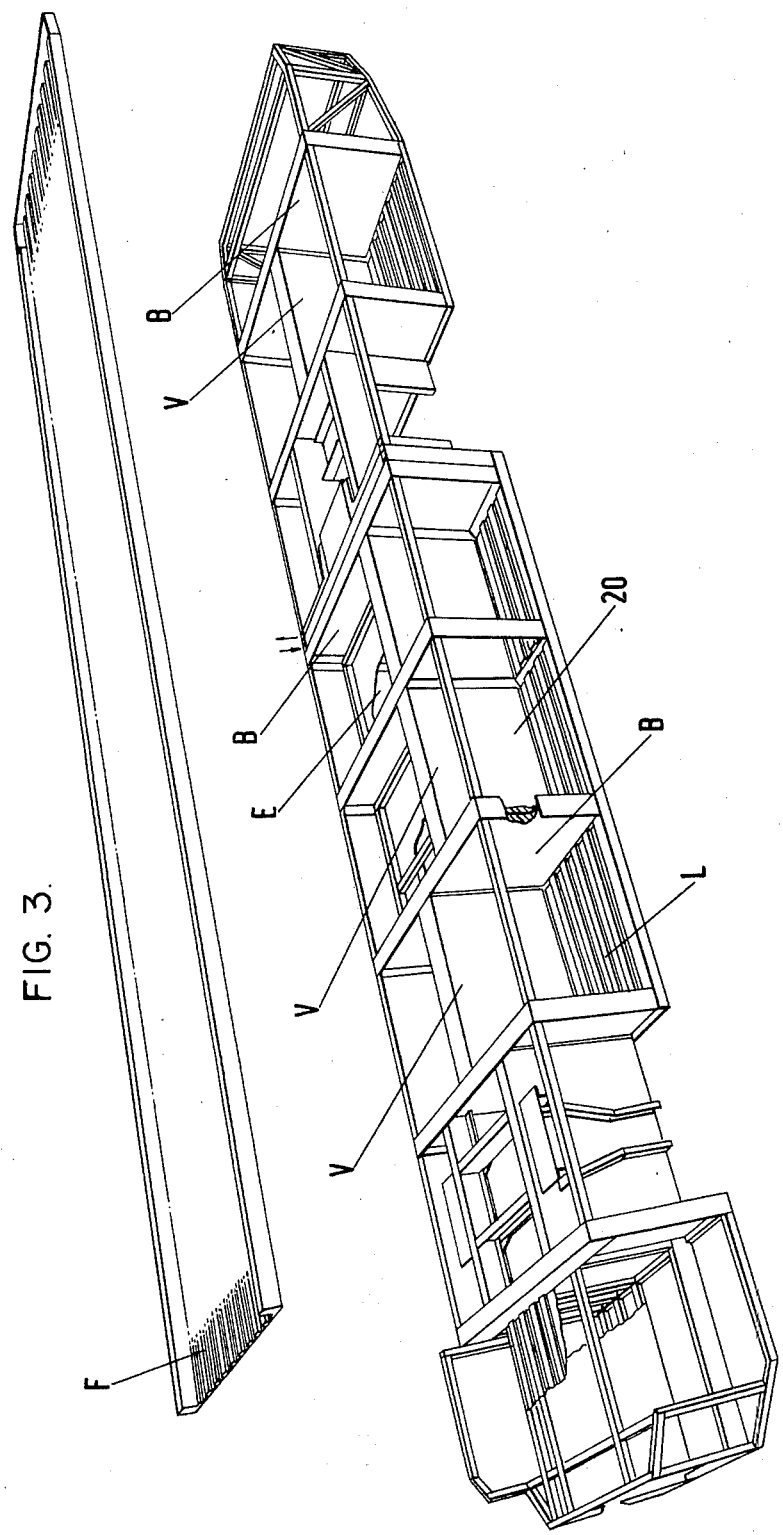
FIG. 3 is a perspective view of part of the coach structure.

FIG. 3 shows the structure of the lower part of the coach which is in the form of a sequence of box structures incorporating flat aluminium panels acting in shear. The upper and lower panels of the boxes are formed at least in part by passenger floor F and luggage floor L respectively. The two floors F, L are separated by vertical shear panels, typically panel V, which resist bending forces applied to the structure. Vertical bulkheads, typically bulkheads B, running transverse the vehicle separate the various compartments. The flat luggage floor L ensures that the underside of the vehicle is clean aerodynamically.

As viewed in FIGS. 1 and 3 the power pack 17 is offset on the right hand side of the vehicle relative to axis 15 in compartment E. A complementary co-extensive compartment 20 on the opposite side of axis 15 has disposed in it a fuel tank 21, battery carrier 22 and tool locker 23. The floor F of a passenger carrying saloon of the coach is partly shown in outline above the lower part of the coach.

The beam axle 13 with its offset differential housing 14 is mounted towards the rear of trailing arms 24, 25 whose forward ends are pivotably attached to the vehicle structure by pivots 27. The rear end of trailing arms 24, 25 are spaced from the vehicle structure by air rolling diaphragm springs 28. Motion of the trailing arms 24, 25 is further controlled by the use of pairs of conventional shock absorbers 29 mounted on individual trailing arms on either side of the beam axle 13. The trailing arms each comprise a parabolic-tapered, quarter-elliptic leaf spring. Axle location is provided by these trailing arms. If additional location is required a panhard rod can be fitted to assist in sideways location of the road wheels 12 of the axle 13.

The front steerable road wheels 11 are each located by independent suspensions of which only the upper wishbones 31, 32 are shown (in FIG. 1). Trailing arms 33 serve to locate wheel carriers pivotably mounted on wishbones 31 and 32. A rack and pinion device 34, which incorporates power assistance, is used to steer road wheels 11 in response to motion of the steering wheel 35 which is coupled to steering transmission box 36 by way of split shaft 37, 38. Steering box 36 is coupled to the rack and pinion device 34 by way of shaft 39.

The large space 40 left between the front of the power pack 17 and the rear of the front suspension and extending the full width of the vehicle provides for accommodation of passenger luggage. Similar accommodation is provided in the space 41 extending from the rear of the rear suspension to the rear of the vehicle.

The cooling radiator 42 for the engine and transmission system is provided centrally mounted about axis 15 to the front of line 43 between front wheels 11. Air is drawn through radiator 42 by way of a fan within housing 44 which is powered hydrostatically. Among other advantages the hydrostatic drive for the fan does away with the need for a drive shaft linkage between the engine 17 and the fan. The arrangement further allows the fan to be thermostatically controlled to optimise cooling of the engine and transmission.

Combustion air for engine 18 is drawn into the engine along duct 45 from air cleaner 46. A separate duct 47 is provided to allow ventilation of the space surrounding the power pack 17.

The relative disposition of the front suspension and the combined rear suspension and power pack provides for optimum handling and weight distribution from unladen or laden operating state. A maximum luggage boot capacity in spaces 40, 41 is provided combined with ease of access to items requiring regular service or access such as the engine 17, transmission 19, fuel tank 21, battery carrier 22 and tool locker 23. Items of the running gear of the vehicle most likely to generate noise are so disposed as to be easily enclosable by noise suppression panels and other means. Further minimum complexity in piping and wiring leads is ensured by mounting the major items of the running gear adjacent to each other without unduly prejudicing serviceability. When necessary the power pack can easily be removed through the side of the vehicle. The arrangement also allows the use of a simple exhaust pipe configuration together with a large silencer.

The use of a wishbone independent front suspension provides for minimal intrusion of suspension components into the central luggage space 40. High roll stiffness can be achieved without the use of an anti-roll bar. Self-levelling can also be incorporated as an optional extra together with torsion bar springs without intrusion into the luggage space.

The rear suspension described intrudes to a minimum extent into the rear luggage space 41. It also allows for high roll stiffness by the use of inboard springs. The periodicity of the rear suspension remains constant throughout the weight operating range of the coach.

The type of construction described in connection with FIG. 3 gives a structure which is stiff both in torsion and bending. The bending strength comes from the vertical panels. Torsional stiffness arises from the use of bulkheads B and longitudinal members V. The torsional stiffness of the understructure alone will be comparable with that of a complete conventionally structured coach. The combined stiffness of both the understructure and body will therefore be significantly greater by comparison with a conventional coach. The structure proposed will also act to inhibit suspension resonances from exciting body vibration. The box type of construction provides a structure made up of compartments which are simultaneously an integral part of the structure and enclosures for luggage, noise suppression, ventilation ducts, etc. Such a construction reduces weight and cost by comparison with a conventional type. The use of flat panels provides for simplicity in original building method and panel replacement. The structure is simply built from panels cut to size and joined by riveting to extruded members.

I claim:

1. In a passenger-carrying public service vehicle having front mounted steerable road wheels, rear mounted driveable road wheels and a passenger compartment floor extending over said wheels, the improvement which comprises:
    a series of boxes beneath said floor, which floor forms the tops of said boxes while load-carrying floor means forms a bottom for each of said boxes, one of said boxes constitutes an engine compartment, and two others constitute load-carrying compartments,
    transverse partitions between said floors defining walls between said boxes, and additional partitions in said boxes extending longitudinally of said vehicle,
    said engine compartment being positioned forwardly of the rear wheels,
    one of said load carrying compartments being positioned between the engine compartment and the rear of the front wheels and extending over substantially the width of the vehicle, and
    the other load-carrying compartment being disposed behind the rear wheels.

2. A public service vehicle as claimed in claim 1 characterized in that the power pack comprises an internal combustion engine directly coupled to a gearbox, the engine compartment being offset from the center line of the vehicle to provide a complementary compartment on the opposite side of the center line for auxiliary equipment the complementary compartment being co-extensive with the engine compartment.

3. A public service vehicle according to claim 1 characterized by a radiator for a cooling system for the power pack the radiator being mounted forwardly of front axle center line.

* * * * *